(No Model.)
C. BEUTTEL & P. P. BRAÜCH.
BUTTON HOLE SEWING MACHINE.
No. 271,405. Patented Jan. 30, 1883.
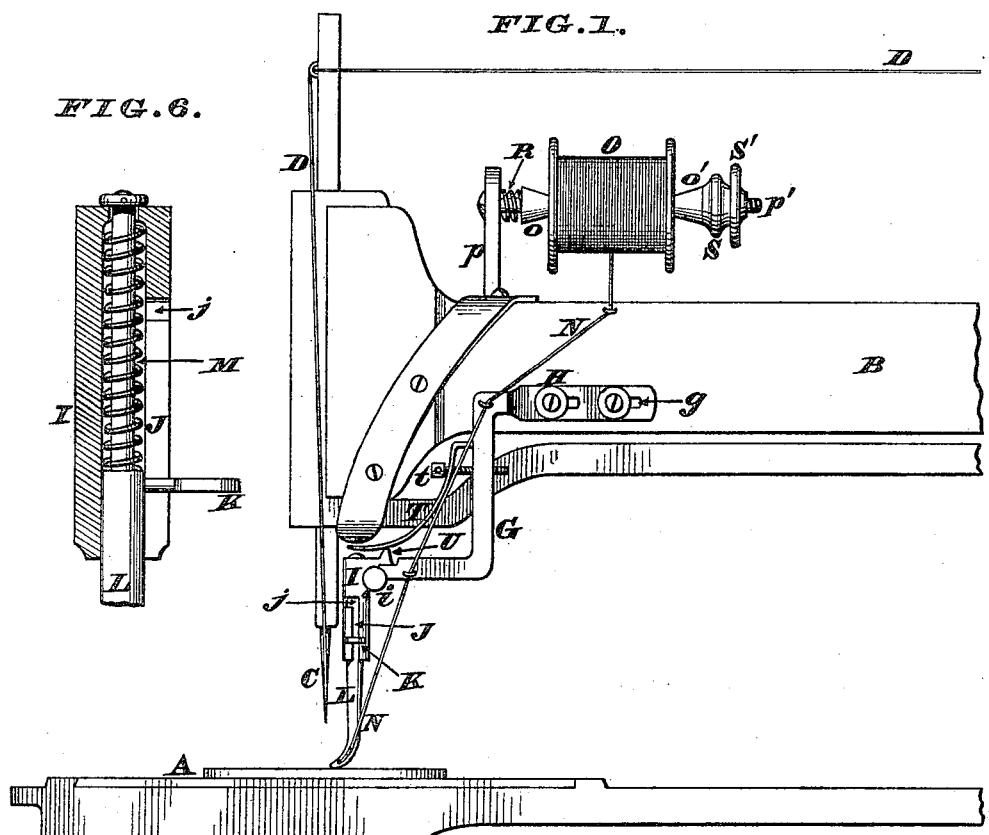
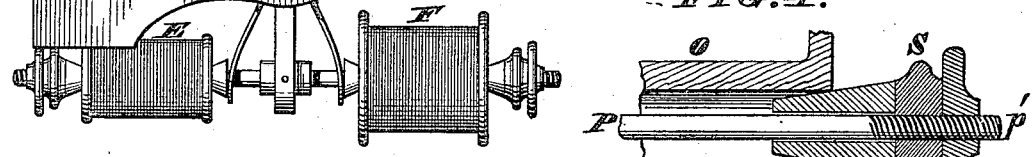
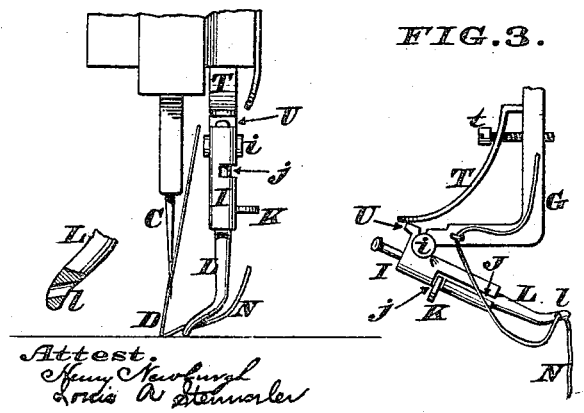
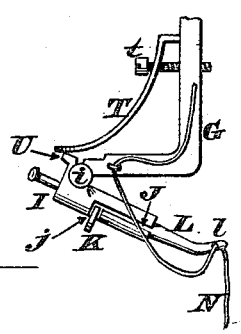
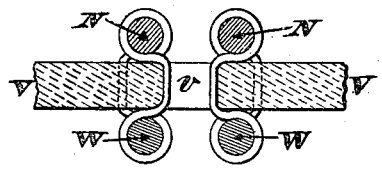

UNITED STATES PATENT OFFICE.

CHARLES BEUTTEL AND PHILIP P. BRAÜCH, OF CINCINNATI, OHIO, ASSIGNORS OF ONE-THIRD TO HENRY NEWBURGH, OF SAME PLACE.

BUTTON-HOLE SEWING-MACHINE.

SPECIFICATION forming part of Letters Patent No. 271,405, dated January 30, 1883.

Application filed November 20, 1882. (No model.)

*To all whom it may concern:*

Be it known that we, CHARLES BEUTTEL and PHILIP P. BRAÜCH, both citizens of the United States, residing at Cincinnati, in the county of Hamilton and State of Ohio, have invented certain new and useful Improvements in Button-Hole Sewing-Machines, of which the following is a specification, reference being had therein to the accompanying drawings.

This invention relates to those sewing-machines which are provided with attachments for stitching an extra cord around a button-hole, said cord being applied to the rear side of the latter, in order that the garment may present the same finished appearance both in front and rear; and our improvement consists in coupling the leader of this extra cord to the machine in such a manner as to enable the free end of said leader to be swung upwardly and rearwardly for the purpose of affording the most convenient access to the needle and to the work on the cloth-plate, as hereinafter more fully described, and pointed out in the claims.

Another feature of our invention consists in providing the leader-sheath with a lug, against which latter bears a spring that maintains the attachment both in its effective end inoperative positions, as hereinafter more fully described, and pointed out in the claims.

Our invention further consists in arranging the leader so as to be retracted a sufficient distance and locked to the sheath when not in use, a spiral spring being fitted within this sheath for the purpose of maintaining the protruded leader in contact with the goods, as hereinafter more fully described, and pointed out in the claims.

In the annexed drawings, Figure 1 is a side elevation of a portion of a button-hole sewing-machine provided with our attachment, the leader or guide thereof being shown in its operative position. Fig. 2 is a front elevation of the leader and its accessories. Fig. 3 is a side elevation, showing the leader in its inoperative position. Fig. 4 is an enlarged axial section of the tension device of the spool that contains the upper cord. Fig. 5 is a greatly-enlarged transverse section through a finished button-hole. Fig. 6 is an enlarged axial section of the sheath or socket of the leader.

A represents the cloth-plate, B the arm, C the needle, D the upper thread, E the lower thread, and F the ordinary cord, of a machine such as furnished by the Union Button-Hole Sewing-Machine Company, of Boston, Massachusetts.

Attached preferably to one side of the arm B is an angularly-bent hanger, G, slotted at $g$ to admit screws H, in order that said hanger may be readily adjusted as occasion may require. Hinged to the lower end of this hanger, at $i$, is a tubular socket or sheath, I, said sheath being slotted longitudinally at J, which slot terminates at top with a transverse notch, $j$.

Adapted to traverse the slot J is a pin, thumb-piece, or detent, K, projecting laterally from the leader or guide L, the latter being maintained in contact with the goods by the coiled spring M. (Seen in Fig. 6.) The lower end of leader L is bent, as shown, and has an eye or notch, $l$, to admit the cord or gimp, which cord is unreeled from a spool, O, mounted on a shaft, P, that projects horizontally from a standard, $p$, secured to the arm B. Spool O rests on two conical bearings, $o$ $o'$, against one of which, $o$, presses a coiled spring, R, while the other bearing, $o'$, is adjusted by the nut S and jam-nut S', said devices S S' being engaged with the screw-threaded portion $p'$ of shaft P, as more clearly seen in Fig. 4. The bearings $o$ $o'$, however, revolve loosely on said shaft.

Attached by one end to hanger G is a spring, T, the free end of which bears against a lug, U, at the top of leader-sheath I.

$t$ is a screw for regulating the tension of said spring.

In arranging the machine for use the threads D E and lower cord, F, are applied in precisely the same manner as they are to the machine previously alluded to, the leader L being first swung up to the position seen in Fig. 3, so as to allow the most convenient access to needle C, said leader being held in this position by the pressure of spring T against the lug U. The upper cord or gimp, N, is then inserted in the eye $l$, and the leader is turned down to the erect position, as seen in Figs. 1 and 2, the stress of spring T holding the sheath I securely in place, while the concealed spiral spring M maintains the leader L in contact with the goods. The piece of goods V (seen in Fig. 5) is then applied to the clamp in the same manner as in the Union machine, and the operator then proceeds to stick the lower cord, W, around the margin of the button-hole $v$; but as this proceeding is identical with that of the machine just referred to further description of this cording process is unnecessary.

By referring to Fig. 2 it will be noticed that the leader L conducts the upper cord, N, so as to dispose it immediately in the rear of needle C, and as the latter reciprocates vertically and vibrates laterally said cord is stitched around the upper margin of the button-hole $v$ at the same time the other cord W is being stitched around the lower margin of said hole. Consequently the fabric presents the same appearance on both sides, as seen in Fig. 5. In this illustration, however, no attempt has been made to represent the exact form of stitching employed, the only object of said illustration being to show that the upper cord, N, and the lower one, W, are in line with each other, present the same appearance, and are secured with the same threads. Hence it follows that any kind of a stitch may be employed, provided both cords are attached at one operation.

Preparatory to swinging the leader L up to the position seen in Fig. 3, said leader may be retracted by causing the pin K to traverse the slot J, and then engaging said pin with the retaining-notch $j$. Finally, the tension of the upper cord, N, can be regulated by adjusting the devices S S' o'.

We are aware it is not new to provide a sewing-machine with a carrier for applying an extra cord to a button-hole, and to arrange said carrier to be turned aside laterally, as such a construction is seen in Letters Patent No. 239,367, granted March 29, 1881, to Frank W. Cross. Consequently our claims are not to be construed as an attempt to cover a laterally-turning carrier or leader, but are limited to a leader whose free end swings upwardly and rearwardly, as herein described and illustrated.

We claim as our invention—

1. The combination, with a button-hole sewing-machine, of a perforated leader for guiding an extra cord, as herein described, said leader being coupled to the machine so as to permit the free end of the former swinging upwardly and rearwardly, for the purpose stated.

2. The combination, with a button-hole sewing-machine, of a perforated leader coupled to the machine in the manner described and maintained both in its effective and inoperative positions with a single spring, as set forth.

3. The combination, in a button-hole sewing-machine, of hanger G, jointed sheath I $i$, having slot J and notch $j$, sliding leader L $l$ K, and spring M, for the purpose described.

4. The combination, in a button-hole sewing-machine, of hanger G, jointed sheath I $i$, leader L $l$, lug U, and spring T, for the purpose specified.

5. The combination, in a button-hole sewing-machine, of a perforated leader that is advanced from its sheath by a spring coiled within the latter, said sheath being coupled to the machine so as to be swung upwardly and rearwardly and to be locked both in its effective and inoperative position, as herein described.

In testimony whereof we affix our signatures in presence of two witnesses.

CHARLES BEUTTEL.
PHILIP P. BRAÜCH.

Witnesses:
JAMES H. LAYMAN,
SAML. S. CARPENTER.